(12) United States Patent
Kelman et al.

(10) Patent No.: US 7,494,256 B1
(45) Date of Patent: Feb. 24, 2009

(54) ILLUMINATED INSTRUMENT CLUSTER WITH PERCEIVED 3-D DISPLAY SEGMENTS

(75) Inventors: Zinoviy Kelman, Bloomfield Hills, MI (US); Ching Fong, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 216 days.

(21) Appl. No.: 11/398,065

(22) Filed: Apr. 5, 2006

(51) Int. Cl.
*B60Q 1/26* (2006.01)
*F21V 33/00* (2006.01)
*B60Q 1/54* (2006.01)
*B29C 35/08* (2006.01)

(52) U.S. Cl. .......................... 362/489; 362/26; 362/58; 40/546; 428/13; 116/37; 264/400

(58) Field of Classification Search .............. 362/489, 362/545, 85, 26, 28, 30, 600, 546, 547, 552, 362/556; 40/451, 452, 546, 547; 428/98, 428/13; 116/37; 264/400
See application file for complete search history.

(56) References Cited

U.S. PATENT DOCUMENTS

| | | | | |
|---|---|---|---|---|
| 2,071,284 A * | 2/1937 | Hyland | ...................... | 116/244 |
| 2,314,817 A * | 3/1943 | Christensen | ............... | 116/62.1 |
| 2,328,485 A * | 8/1943 | Ott | ........................ | 116/62.3 |
| 4,092,518 A * | 5/1978 | Merard | ...................... | 264/400 |
| 4,215,647 A * | 8/1980 | Fukasawa | ................... | 116/286 |
| 4,252,078 A * | 2/1981 | Fukasawa et al. | ........... | 116/288 |
| 4,761,715 A * | 8/1988 | Brooks | ....................... | 362/26 |
| 5,272,463 A * | 12/1993 | Furuya et al. | ................. | 362/23 |
| 5,353,735 A * | 10/1994 | Arai et al. | ................... | 116/286 |
| 5,575,936 A * | 11/1996 | Goldfarb | ............... | 219/121.68 |
| 5,764,391 A * | 6/1998 | Smith | ........................... | 362/26 |
| 5,890,796 A | 4/1999 | Marinelli et al. | | |
| 6,086,211 A | 7/2000 | Ohkawa | | |
| 6,402,335 B1 | 6/2002 | Kalantar et al. | | |
| 6,537,479 B1 * | 3/2003 | Colea | ........................ | 264/400 |
| 6,594,926 B1 * | 7/2003 | Wujciga | ...................... | 40/200 |
| 6,605,797 B1 * | 8/2003 | Troitski | ................. | 219/121.69 |
| 7,024,809 B1 * | 4/2006 | Poma | ........................ | 264/400 |
| 7,193,729 B1 * | 3/2007 | Li | .............................. | 356/614 |
| 7,236,089 B2 * | 6/2007 | Ono et al. | .................... | 340/461 |
| 2002/0001185 A1 * | 1/2002 | Wilhelm et al. | .............. | 362/30 |
| 2003/0095398 A1 * | 5/2003 | Parker et al. | .................. | 362/29 |
| 2004/0085746 A1 | 5/2004 | Chen | | |
| 2004/0089837 A1 | 5/2004 | Bauer et al. | | |
| 2004/0130912 A1 | 7/2004 | Miyashita | | |
| 2004/0141325 A1 * | 7/2004 | Davenport | .................. | 362/351 |
| 2006/0216441 A1 * | 9/2006 | Schubel et al. | ................ | 428/13 |

* cited by examiner

*Primary Examiner*—Ismael Negron
(74) *Attorney, Agent, or Firm*—Harness, Dickey & Pierce, P.L.C.

(57) ABSTRACT

A vehicle instrument cluster for indicating a value of a vehicle parameter. The vehicle instrument cluster includes a display member formed of a transparent material and display segments integrally formed within the display member. The display segments are configured to diffuse light and the display segments form at least a portion of indicia associated with the vehicle parameter. A first illumination system has a light source and a motor connected to an optical member. The optical member is movable in response to a change in the value of the vehicle parameter. The optical member selectively directs the light from the light source to within the display member to illuminate at least a portion of the display segments that form the indicia to indicate the value of the vehicle parameter.

34 Claims, 14 Drawing Sheets

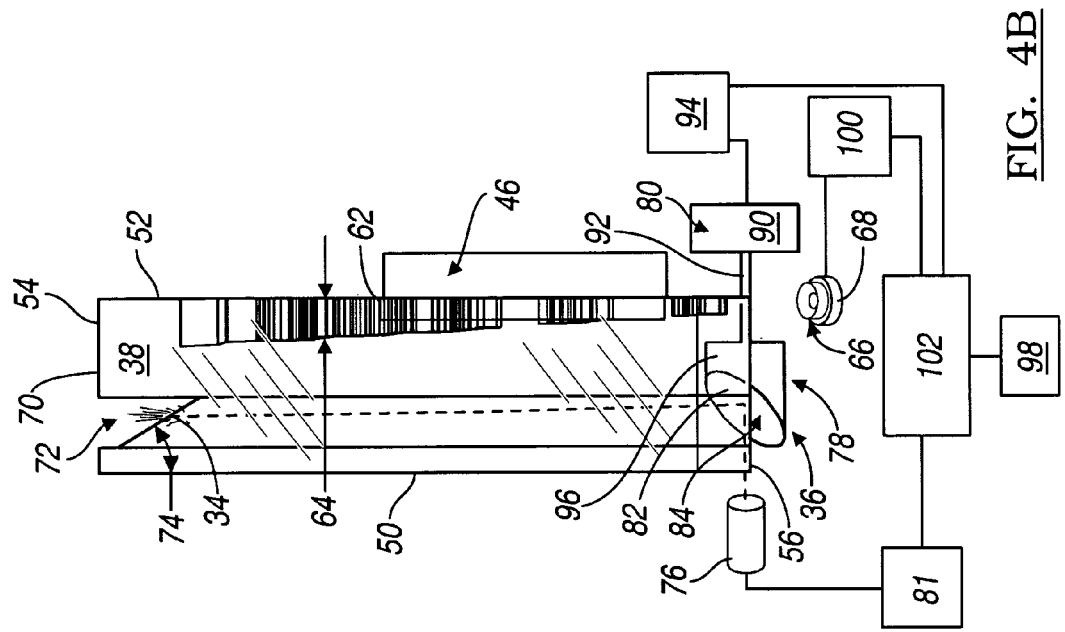
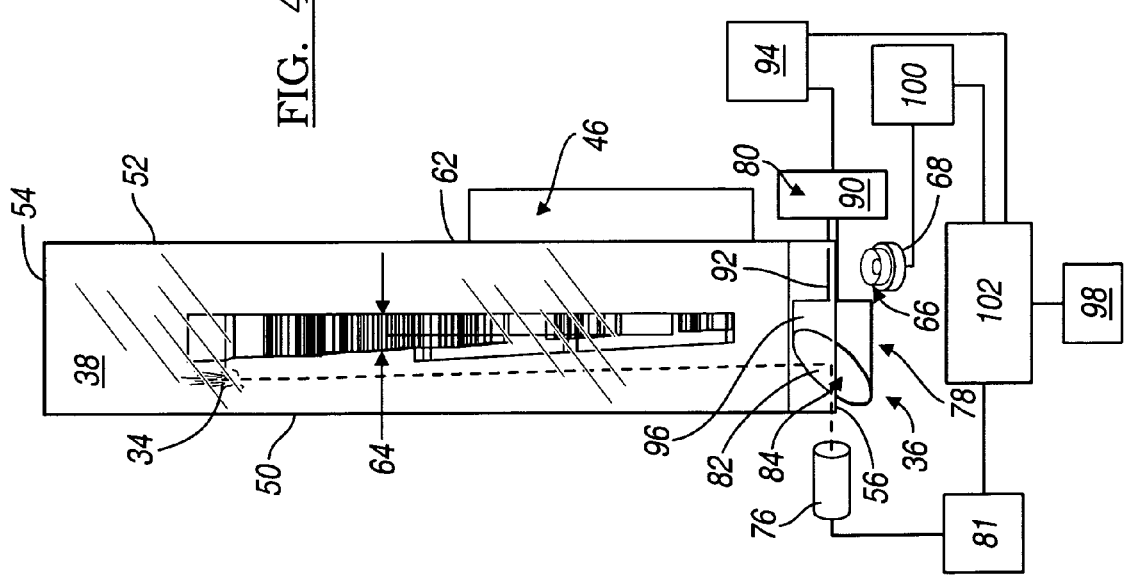

ILLUMINATED INSTRUMENT CLUSTER WITH PERCEIVED 3-D DISPLAY SEGMENTS

FIELD

The present teachings relate to an instrument cluster and more specifically to a three dimensional instrument cluster using focused light illumination to indicate a value of a vehicle parameter within the instrument cluster.

BACKGROUND

Typically, an instrument cluster has a multi-layer appliqué mounted to a backing. The appliqué may form a plurality of markings formed through the appliqué indicative of certain values of one or more vehicle parameters. Lights associated with the markings may illuminate each marking through the appliqué. A rotateable pointer that extends from the appliqué may move relative to the markings to indicate a value of the vehicle parameter associated with one or more of the markings. For example, the physical rotateable pointer may point to a marking on the appliqué that represents twenty-five miles per hour, such that the vehicle parameter is vehicle speed and twenty-five miles per hour is the value of the vehicle parameter.

There is typically limited space available on the instrument cluster. There is, however, demand for more information space in the instrument cluster. As the rotatable pointer sweeps through its arc of motion, the pointer can obstruct portions of the appliqué. In this regard, the area covered by the pointer's arc of motion tends to limit space in the appliqué.

SUMMARY

The present teachings generally include a vehicle instrument cluster for indicating a value of a vehicle parameter. The vehicle instrument cluster includes a display member formed of a transparent material and display segments integrally formed within the display member. The display segments are configured to diffuse light and the display segments form at least a portion of indicia associated with the vehicle parameter. A first illumination system has a light source and a motor connected to an optical member. The optical member is movable in response to a change in the value of the vehicle parameter. The optical member selectively directs the light from the light source to within the display member to illuminate at least a portion of the display segments that form the indicia to indicate the value of the vehicle parameter.

Further areas of applicability of the present teachings will become apparent from the detailed description and appended claims provided hereinafter. It should be understood that the detailed description and specific examples, while indicating the various embodiments of the present teachings, are intended for purposes of illustration only and are not intended to limit the scope of the teachings.

BRIEF DESCRIPTION OF THE DRAWINGS

The present teachings will become more fully understood from the detailed description, the appended claims and the accompanying drawings, wherein:

FIG. 4A is a diagram of the instrument cluster of FIG. 3A showing the display member with indicia formed therein and a first illumination system and a second illumination system in accordance with the present teachings;

FIG. 4B is a diagram of the instrument cluster of FIG. 3B showing the display member with indicia formed therein and a first illumination system and a second illumination system in accordance with the present teachings;

DETAILED DESCRIPTION OF THE VARIOUS EMBODIMENTS

The following description of the various embodiments is merely exemplary in nature and is in no way intended to limit the teachings, their application, or uses.

Figure 1:
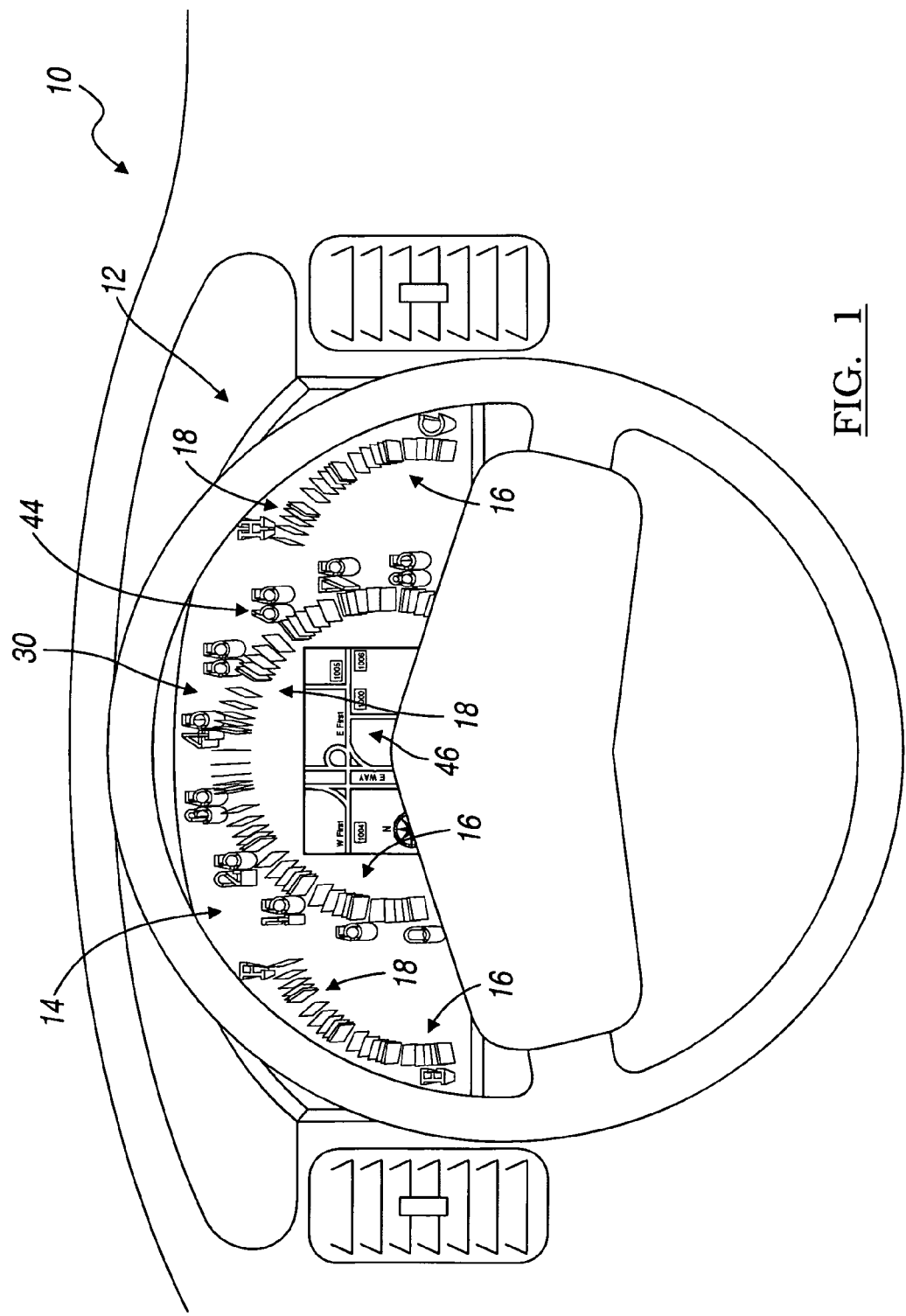
FIG. 1 is a partial front view of a dash panel of a vehicle showing an exemplary three dimensional instrument cluster housed within the dash panel in accordance with the present teachings.
Figure 3A:
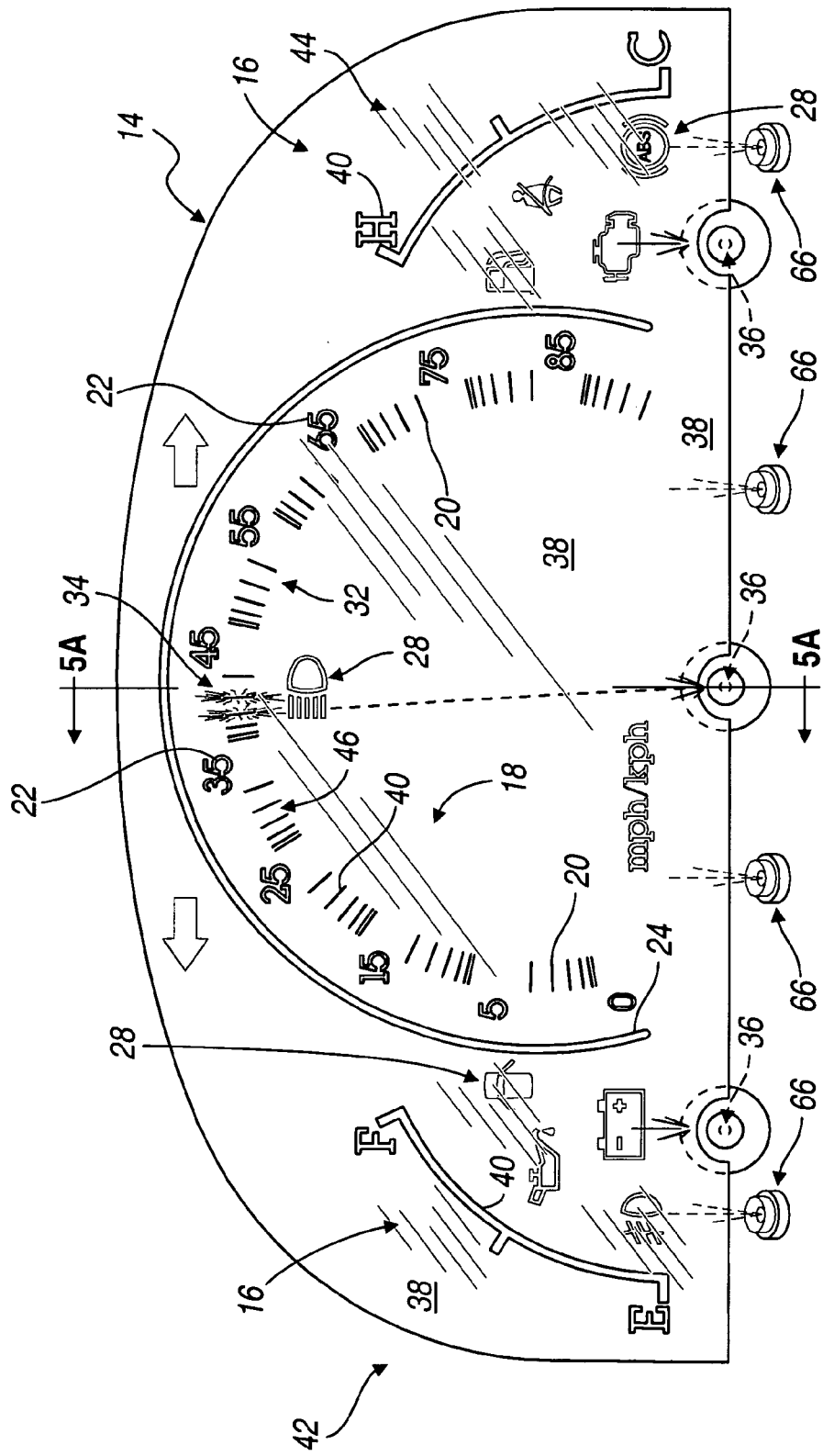
FIG. 3A is a front view of a three dimensional instrument cluster showing a plurality of indicia associated with a speedometer, a fuel gauge and a engine coolant temperature gauge in accordance with the present teachings.

With reference to FIGS. 1 and 3A, a portion of a vehicle 10 may include a dash panel 12 housing a three dimensional instrument cluster 14 in accordance with the present teachings. The instrument cluster 14 may include one or more instruments or gauges 16. In one example, a speedometer in the instrument cluster 14 includes indicia 18. The indicia 18 may include one or more tick marks 20, characters 22, borders 24, bands 26, display indicators 28 and/or combinations thereof, illustrated in further detail in FIG. 3A.

Figure 2:
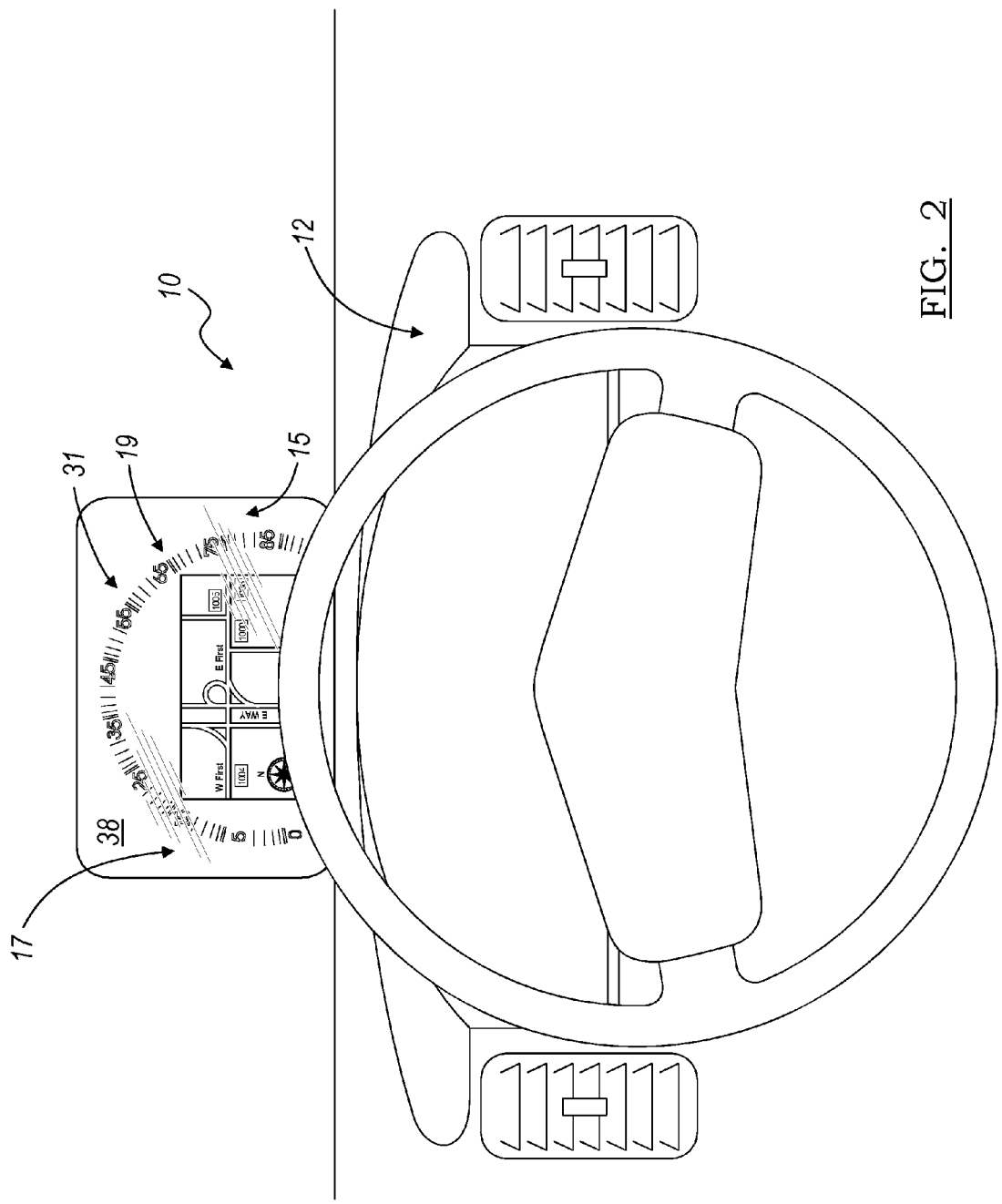
FIG. 2 is a partial front view of a dash panel of a vehicle showing an exemplary three dimensional instrument cluster disposed in a high mount position relative to the dash panel in accordance with the present teachings.

With reference to FIG. 2, the vehicle 10 includes the dash panel 12 having a three dimensional instrument cluster 15 in accordance with an additional example of the present teachings. The instrument cluster 15 may be mounted in a high-mount position on the dash panel 12. In this example, other gauges 16 may be located at other locations in the dash panel 12, e.g., in the middle of the dash panel 12 relative to the vehicle 10. Notwithstanding the gauges 16 mounted in other locations in the dash panel, the three-dimensional instrument cluster 15 may include one or more gauges 17 having the indicia 19. In addition, the high-mount instrument cluster 15 may be used in combination with (or in lieu of) the instrument cluster 14 contained within the dash panel 12, as illustrated in FIG. 1. It will be appreciated in light of the disclosure that one or more structures and/or features of the instrument cluster 14 disclosed throughout can be implemented with the instrument cluster 15.

In one example and with reference to FIG. 3A, one of the gauges 16 in the instrument cluster 14 may be a speedometer 30. The speedometer 30 may include the indicia 18 such that the tick marks 20 and the characters 22 may (alone or in combination) indicate a speed scale 32 (e.g., 5, 15, 25, etc.) The speedometer 30 may optionally include the border 24, which may be used to demarcate the speedometer 30 from other gauges 16 on the instrument cluster 14.

The speedometer 30 and/or other gauges 16 may include a pointer 34 that is integral to (i.e., formed within) the instrument cluster 14 and moveable relative to the indicia 18 contained therein. A position of the pointer 34 in the speedometer 30 relative to the speed scale 32 may indicate a vehicle speed. Specifically, the pointer 34 may be a portion of reflected light that may be generated by a first illumination system 36 and directed into a display member 38 of instrument cluster 14. The pointer 34 may appear visually (i.e., glow in a visible spectra more intensely relative to other indicia 18) due to the specifically directed light from the first illumination system 36. It will be appreciated that the pointer 34 may only be light and as such, may lack a physical form (e.g., a rotatable physical pointer having a hub and a needle).

The pointer 34, as generated by the first illumination system 36, may include the illumination of one or more display segments 40. In this regard, each of the indicia 18 (or portions thereof) may be formed by a plurality of the display segments 40. By illuminating the display segments 40 of certain indicia 18 to form the pointer 34, the pointer 34 may indicate the value of the vehicle parameter associated with the indicia 18. For example, the first illumination system 36 may illuminate the display segments 40 that form the characters 22 (or other indicia 18) that form the number twenty-five in the speedometer 30. The pointer 34 therefore indicates that the value of the vehicle parameter is twenty-five. In another example, the pointer 34 may illuminate a portion of the band 26 to indicate that the value of the vehicle parameter is twenty-five miles per hour.

Figure 3B:
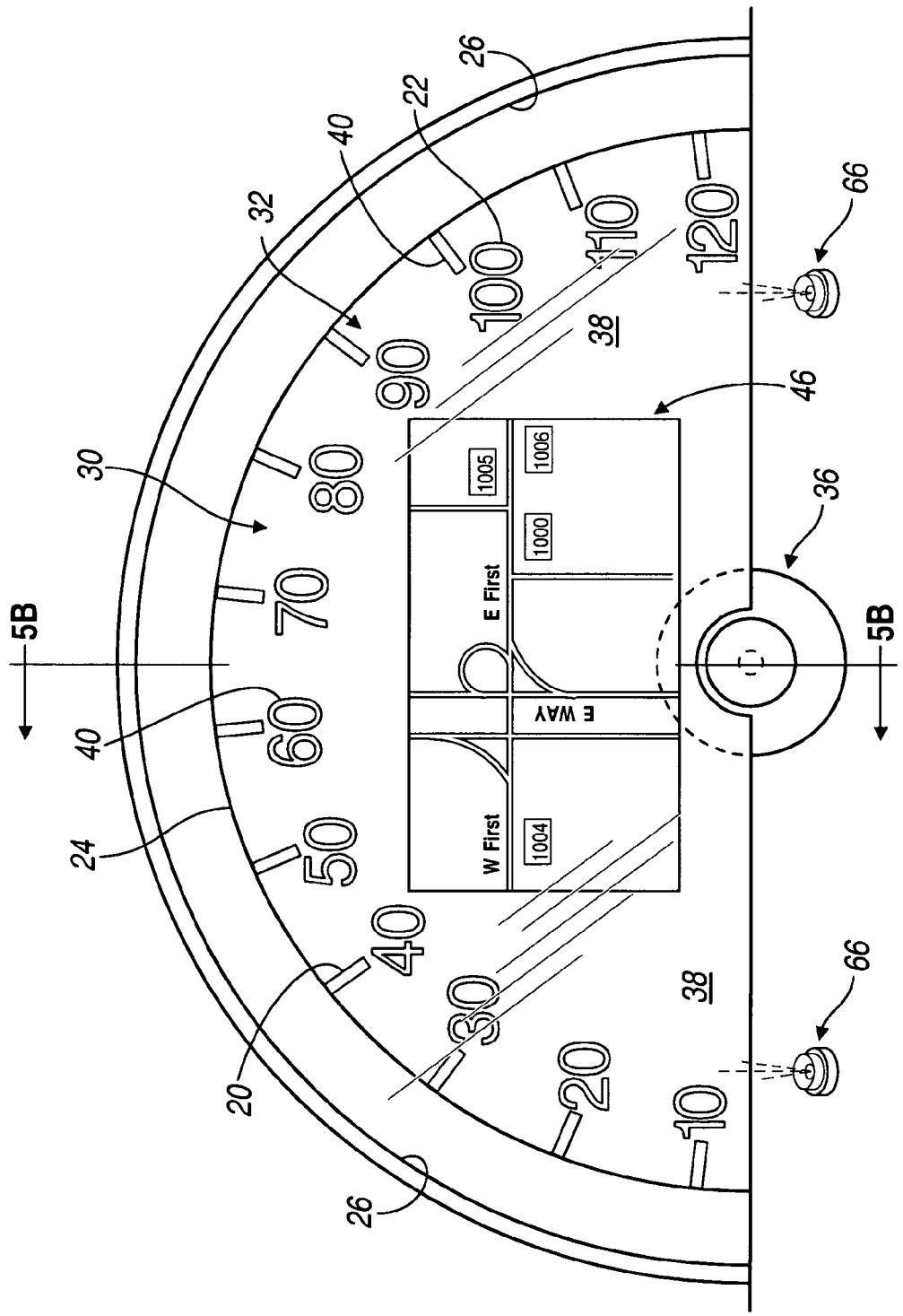
FIG. 3B is a front view of a three dimensional instrument cluster showing a plurality of indicia associated with a speedometer and a display mounted to the back of a display member but visible therethrough in accordance with the present teachings.

The instrument cluster 14 may include, but is not limited to, one or more of the following gauges 16: A tachometer, a fuel gauge 42, an oil pressure gauge, a battery voltage gauge, an engine coolant temperature gauge 44, an outside temperature gauge, other suitable gauges and combinations thereof. In addition, the instrument cluster 14 may include, but is not limited to, one or more of the following display indicators 28: Open door(s), engine maintenance required, fasten seat belt, fog lamps, bright lights, oil pressure low/high, voltage low/high, anti-lock braking system malfunction, fuel low, oil change required, liftgate ajar, trunk ajar, right turn signal, left turn signal, fuel cap not secured, cruise control active, other suitable display indicators and combinations thereof. The instrument cluster 14 may also include a display 46 (FIG. 3B) such as a liquid crystal display, a gas plasma display, a cathode ray tube display, other suitable displays and combinations thereof. The display 46 may display various applicable information such as navigation information, trip information, additional gauges, satellite radio information, user customizable displays, other suitable displays and combinations thereof. It will be appreciated that the above-listed gauges 16 may function and/or may be constructed (in whole or in part) in a similar manner to the speedometer 30 or portions thereof (as applicable) but otherwise indicate their respective vehicle parameters.

In one example, the three dimensional instrument cluster 14 may be formed of one or more of the display members 38. Each display member 38 may be one or more blocks (pieces) of material having rectangular, spherical, other suitable polygonal shapes, no particular shape or a combination of shapes. In this regard, the instrument cluster 14 may be formed of one or more display members 38 and each display member 38 may be formed of one or more blocks (pieces) of material.

Figure 5A:
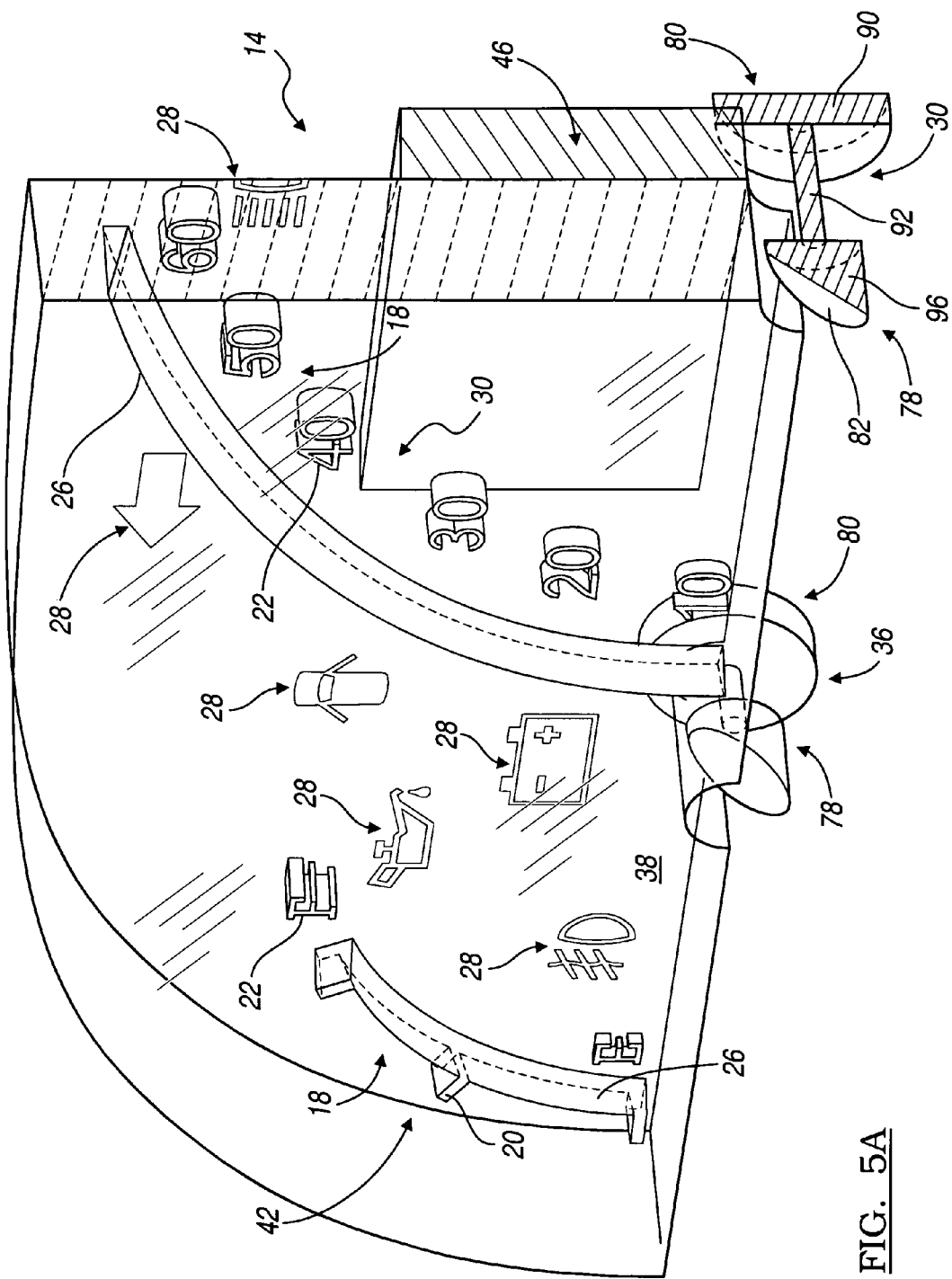
FIG. 5A is a cross-section view of FIG. 3A.
Figure 5B:
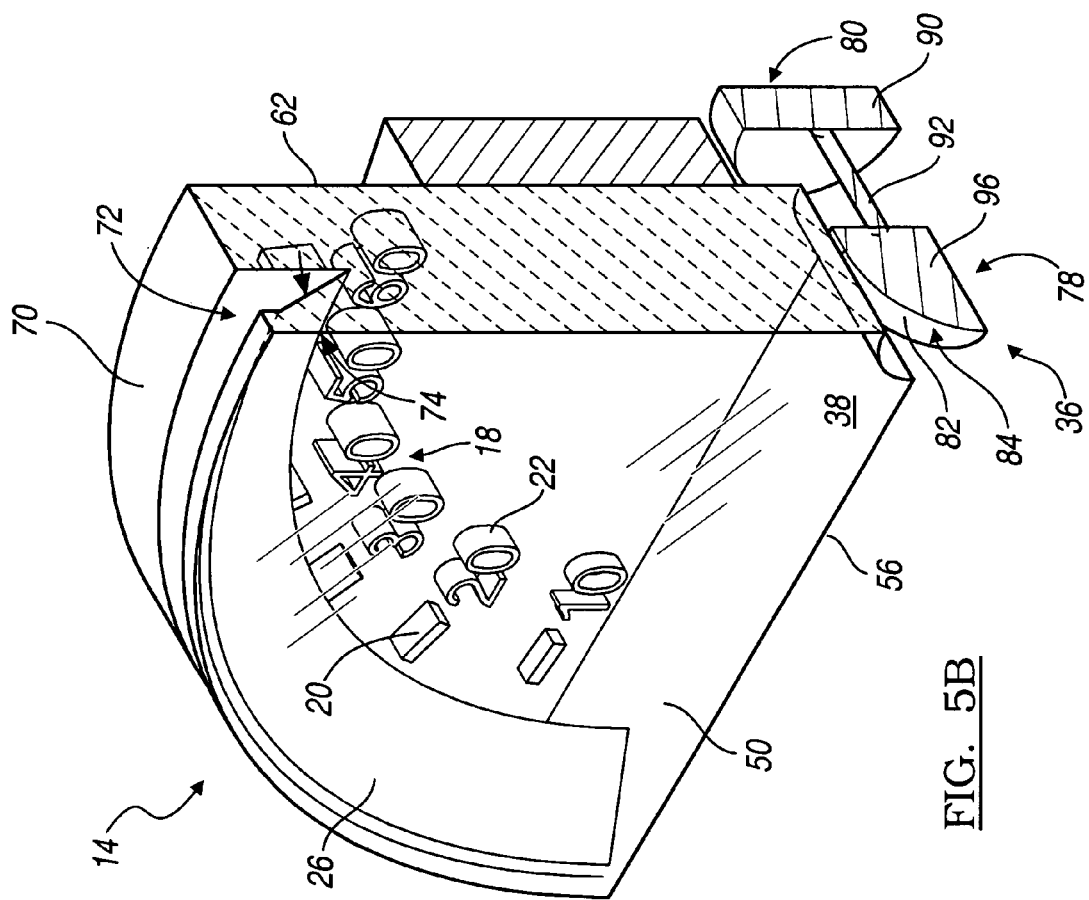
FIG. 5B is a cross-section view of FIG. 3B.

The display members 38 may be made of various suitable materials. In one example and with reference to FIG. 5B, the display member 38 may be made of a suitable acrylic material or a suitable polycarbonate material. When the display member 38 is made of acrylic or polycarbonate, the display member 38 may be produced in a mold (e.g., in an injection molding system) such that forms in the mold may form the indicia 18 into the display member 38. Further details of the mold process are provided below. With reference to FIG. 5A, the display member 38 may also be made of a suitable leaded glass material. When the display member is made of leaded glass, the display member 38 may be produced by distorting (i.e., very narrow localized heat-induced cracking) portions of the display member 38 with a suitable laser 48 (FIG. 12) to form the indicia 18 within the display member 38. Further detail of the laser distortion process in the leaded glass material is also provided below. It will be appreciated that the instrument cluster 14 (or portions thereof) may be formed of any suitable transparent and/or translucent material that may be molded, etched, laser-inscribed, formed by other suitable processes or combinations thereof. Suitable exemplary acrylic material, polycarbonate material or leaded glass material may be obtained from various commercial suppliers such as DuPont® or GE® Plastics.

With reference to FIGS. 4A and 4B, the indicia 18 may be formed such that the thickness of the indicia 18 may vary throughout the display member 38. In one example, the display member 38 may have a front face 50, a rear face 52, a top face 54, a bottom face 56 and side faces 58. The indicia 18 contained within the display member 38 may have a front face 60 and a rear face 62. The front face 60 of the indicia 18 may be associated with the front face 50 of the display member 38, while the rear face 62 of the indicia 18 may be associated with the rear face 52 of the display member 38. A dimension 64 defining a distance between the front face 60 of the indicia 18 and the rear face 62 of the indicia (i.e., the thickness 64 of the indicia 18), may vary throughout the display member 38.

In one example, the thickness 64 of the indicia 18 at the bottom face 56 of the display member 38 (toward the bottom of the page in FIGS. 4A and 4B) may be less than the thickness 64 of the indicia 18 toward the top face 54 of the display member 38 (toward the top of the page). In this regard, light from a second illumination system 66 may be able to illuminate generally all of the indicia 18 because the indicia 18 toward the bottom face 56 of the display member 38 may not cast shadows on the indicia 18 toward the top face 54 of the display member 38. It will be appreciated that the thickness 64, the rate of the thickness change and/or a direction of the thickness change may be based on (in whole or in part) the position of one or more lighting elements 68 in the second illumination system 66.

In one example and with reference to FIG. 4A, the indicia 18 may be formed within the display member 38 such that generally no surface (60, 62) of the indicia 18 is in contact with any of the surfaces (50, 52, 54, 56, 58) of the display member 38. In this regard, the indicia 18 may appear to float within the display member 38. It will be appreciated that some of the indicia 18 may float within the display member 38 and some of the indicia 18 may come near or contact surfaces (50, 52, 54, 56, 58) of the display member 38.

Figure 6:
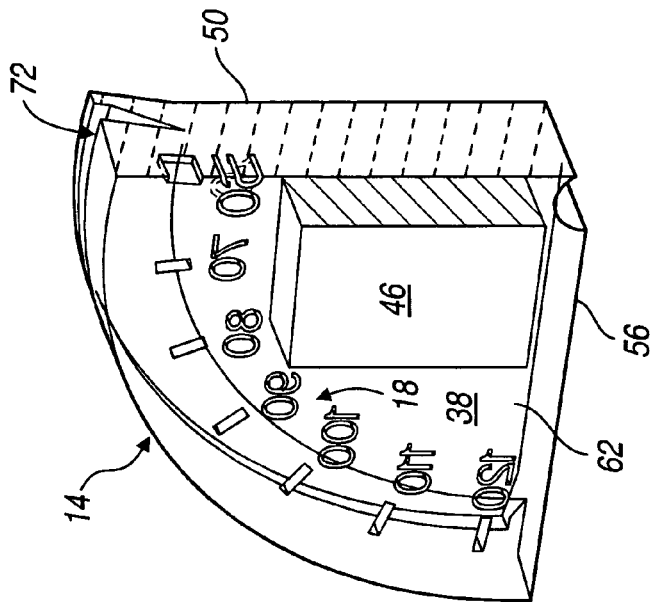
FIG. 6 is a rear view of FIG. 5B.

In a further example and with reference to FIG. 4B, the indicia 18 may be formed during the molding process, such that forms in the mold may cut and texture and thus may form the plurality of the display segments 40 that form the indicia 18 in the display member 38. In this regard, the forms may enter through one or more surfaces (e.g. the rear face 52, as illustrated in FIG. 6) of the display member 38, such that the dimension 64 that defines the thickness 64 of the indicia may be measured from the front face 60 of the indicia 18 to the rear face 52 of the display member 38. It will be appreciated that the forms in the mold may enter along any of the faces (50, 52, 54, 56, 58) of the display member 38 such that the thickness 64 may be measured from the associated surface, e.g., the rear face 52.

With regard to the molding example, one or more of the bands 26 may be formed in the display member 38. To form the band 26, for example, a wedge-shaped form (not shown) may be used in the mold to form the band 26 along a periphery 70 of the display member 38. As illustrated, a recess 72 may remain in the display member 38 after wedge-shaped form is removed. Moreover, the wedge-shaped form may form an angle 74 in the display member 38 such that the angle 74 of the band 26 is formed relative to a face (50, 52, 54, 56, 58) of the display member 38, e.g., the front face 50. The angle 74 may (or may not) vary along the band 26 or relative to other indicia 18 formed in the display member 38.

With reference to FIGS. 4A-5B, the first illumination system 36 may selectively direct the light to illuminate the display segments 40 to generate the pointer 34 on the indicia 18 (or a portion thereof) formed in the display member 38. The first illumination system 36 may include a light source 76, optics 78 and a drive system 80. The light source 76 may be controlled by a light module 81. The light source 76 may direct light through (and/or off of) optics 78 or may direct light into the display member 38 without the optics 78. The light source 76 may produce one or more laser beams. In another example, the light source 76 may produce a less-focused light, e.g., light from Incandescent fixtures, fluorescent fixtures, discharge lamps, other suitable non-laser light sources and combinations of laser and/or non-laser light sources.

Figure 7:
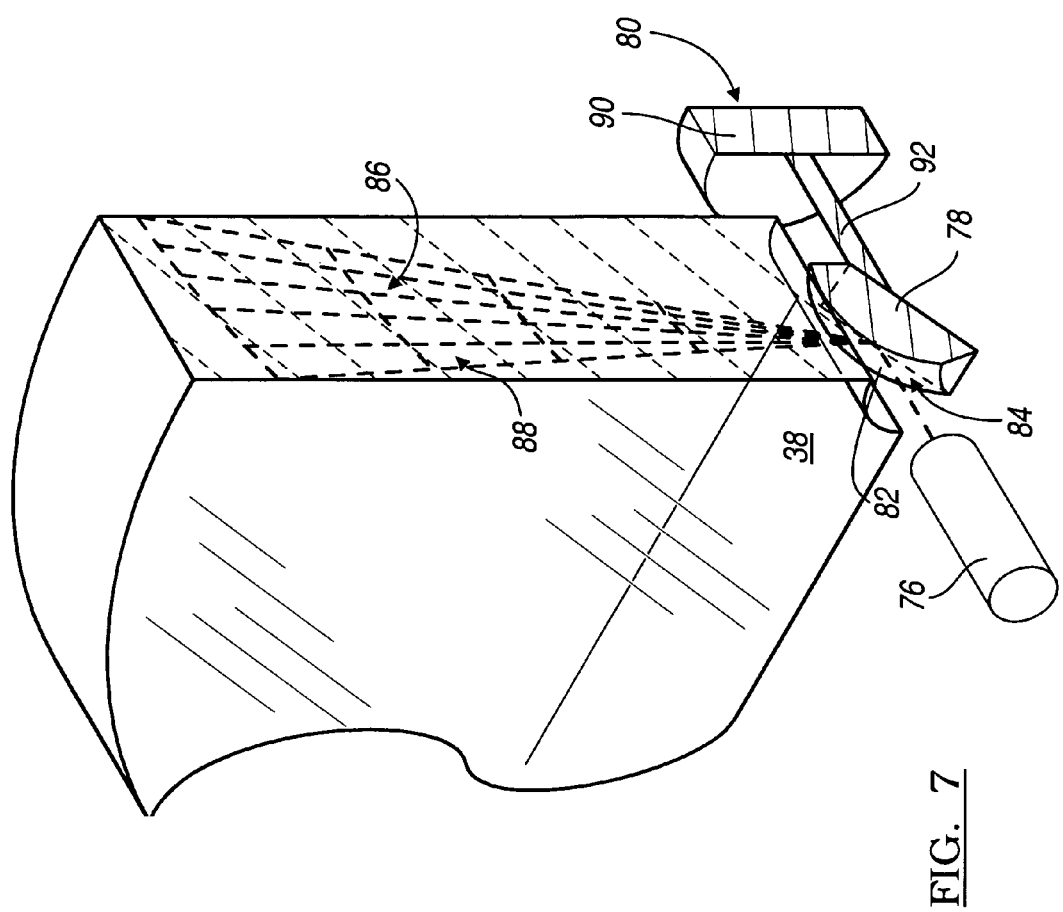
FIG. 7 is a exemplary diagram of the first illumination system having a mirror with a cylindrically-shaped reflective surface that reflects laser light as planar fan-like shape in accordance with the present teachings.

The optics 78 may include lenses, mirrors and/or other suitable items to re-direct, focus (or defocus), diffuse and/or otherwise adjust the light emitted from the light source 76. In one example, a mirror 82 may direct and reshape the laser light toward the display segments 40 in the display member 38 and thus form the pointer 34. In this regard, the pointer 34 appears to be within the display member 38 but no physical pointer is used. With reference to FIG. 7, the mirror 82 may be configured such that a reflective surface 84 that receives and reflects the laser light from the light source 76 is formed in a cylindrical configuration. Specifically, the light source 76 may emit the laser light in a typical fashion, which may be a generally columnar form. The laser light may strike the cylindrically-shaped reflective surface 84 of the optics 78 and may be reshaped and redirected in a planar fan-like shape 86 through the display member 38. Returning to FIGS. 4A-5B, the light in the planar fan-like shape 86 then reflects off (i.e., illuminates) one or more indicia 18 by illuminating the plurality of the display segments 40 that form the indicia 18. The illuminated display segments 40 thus form the pointer 34.

With reference to FIG. 7, a plane 88, in which the light from the first illumination system 36 having the planar fan-like shape 86 that travels, is generally perpendicular to the front face 50 of the display member 38. It will be appreciated that the mirror 82 or other optics 78 may be configured to produce other shapes of light to form the pointer 34. In one example, a mirror may have a convex or a rounded shape that may produce a cone of light, as the laser is reflected off the mirror. In a further example, a mirror may be flat and at generally a forty-five degree angle to the laser light. As such, the columnar-shaped laser light will reflect off the mirror and be maintained in generally a similar columnar form. By maneuvering the mirror, the laser light may be directed to illuminate the display segments 40 in the display member 38.

In one example, the optics 78 and/or the light source 76 may include one or more filters to vary color and/or intensity of the pointer 34. The varying color and/or intensity may be based on the motion of the pointer 34 as it moves throughout the display member 38. Tunable lasers may be used to produce varying colors and/or varying intensities. By way of the above examples, the light from the first illumination system 36 may change in intensity and/or color (e.g., from a green color to a red color) after a threshold speed (or other suitable vehicle parameter) is exceeded.

With reference to FIGS. 4A and 4B, the drive system 80 may include a motor 90 connected to an output member 92 and controlled by a motor module 94. The motor module 94 may control the motor 90 to position the output member 92. The mirror 82, other components of the optics 78 and/or one or more light sources 76 may be connected to the drive system 80 and may rotate with the output member 92. The drive system 80 may also include multiple motors 90, each with one or more of the output members 92. The output member 92 may have a holder 96 that may couple to the optics 78 and/or the light source 76. The holder 96 may be rotated, telescoped, vibrated, etc. relative to the motor 90 and the display member 38. In this regard, the holder 96 positions the optics 78 to illuminate one more of the indicia 18 (or portion thereof) to define the pointer 34 within the display member 38.

In one example, the motor module 94 may receive a linear signal from an engine computer 98. The linear signal, which may be indicative of the value of vehicle speed, may cause the motor module 94 to move the holder 96 a proportional rotational increment based on the speed signal from the engine computer 98. In this regard, the planar fan-like shaped light that forms the pointer 34 may move along the band 26, the tick marks 20 and/or other indicia 18, as the speed of the vehicle changes.

Figure 16:
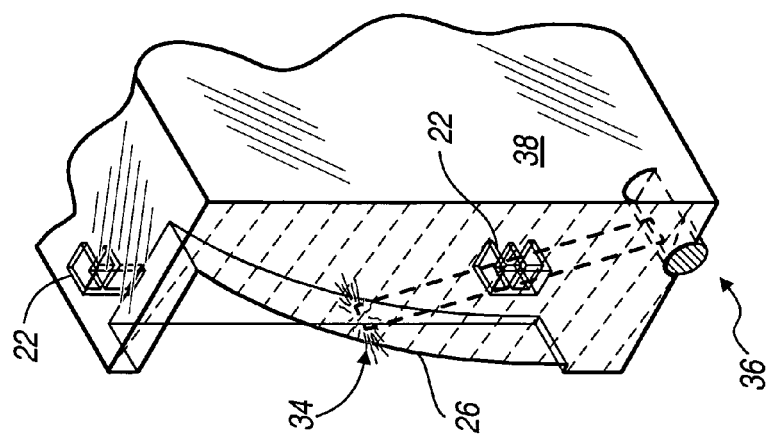
FIG. 16 is a cross-section view of the fuel gauge of FIG. 14 showing a band between the characters associated with the fuel gauge.
Figure 15:
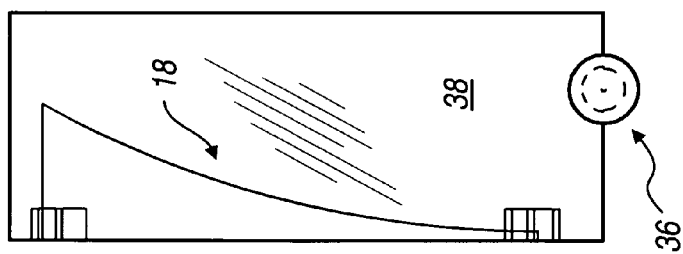
FIG. 15 is a side view of the fuel gauge from FIG. 14.
Figure 14:
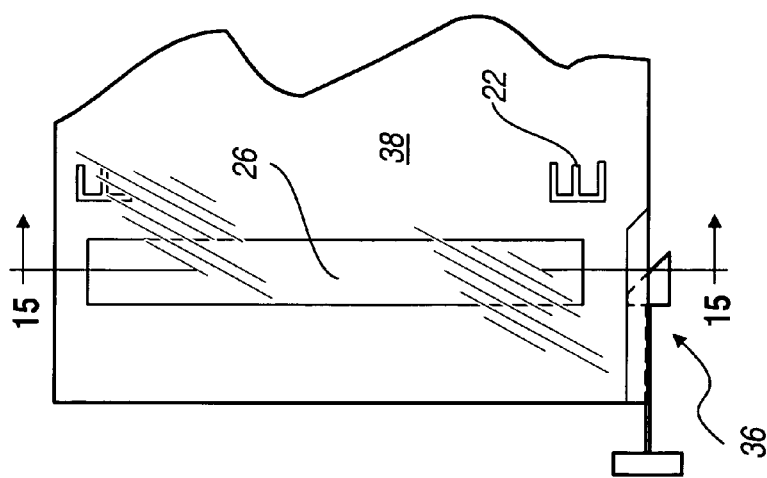
FIG. 14 is a front view of a portion of a three dimension instrument cluster showing a fuel gauge in accordance with an alternative example of the present teachings.

In further examples, the signal from the engine computer 98 received by the motor module 94 may be non-linear or may be binary. In other instances and with reference to FIGS. 14, 15 and 16, the shape and configuration of the display member 38 may be such that proportional rotational motion of the holder 96 may not produce proportional movement of the pointer 34 due to angles, curvatures, etc. in the display member 38 relative to first illumination system 36. Specifically, an orientation of the indicia 18 relative to the optics 78 may change over the range of movement of the holder 96. In this regard, the motor module 94 may reference a lookup table (not specifically illustrated) so that a value transmitted by the engine computer 98 may be translated to a specific position to which the motor module 94 may move the holder 96 and thus point the pointer 34 within the display member 38 to otherwise provide the appearance of linear motion.

Figure 8:
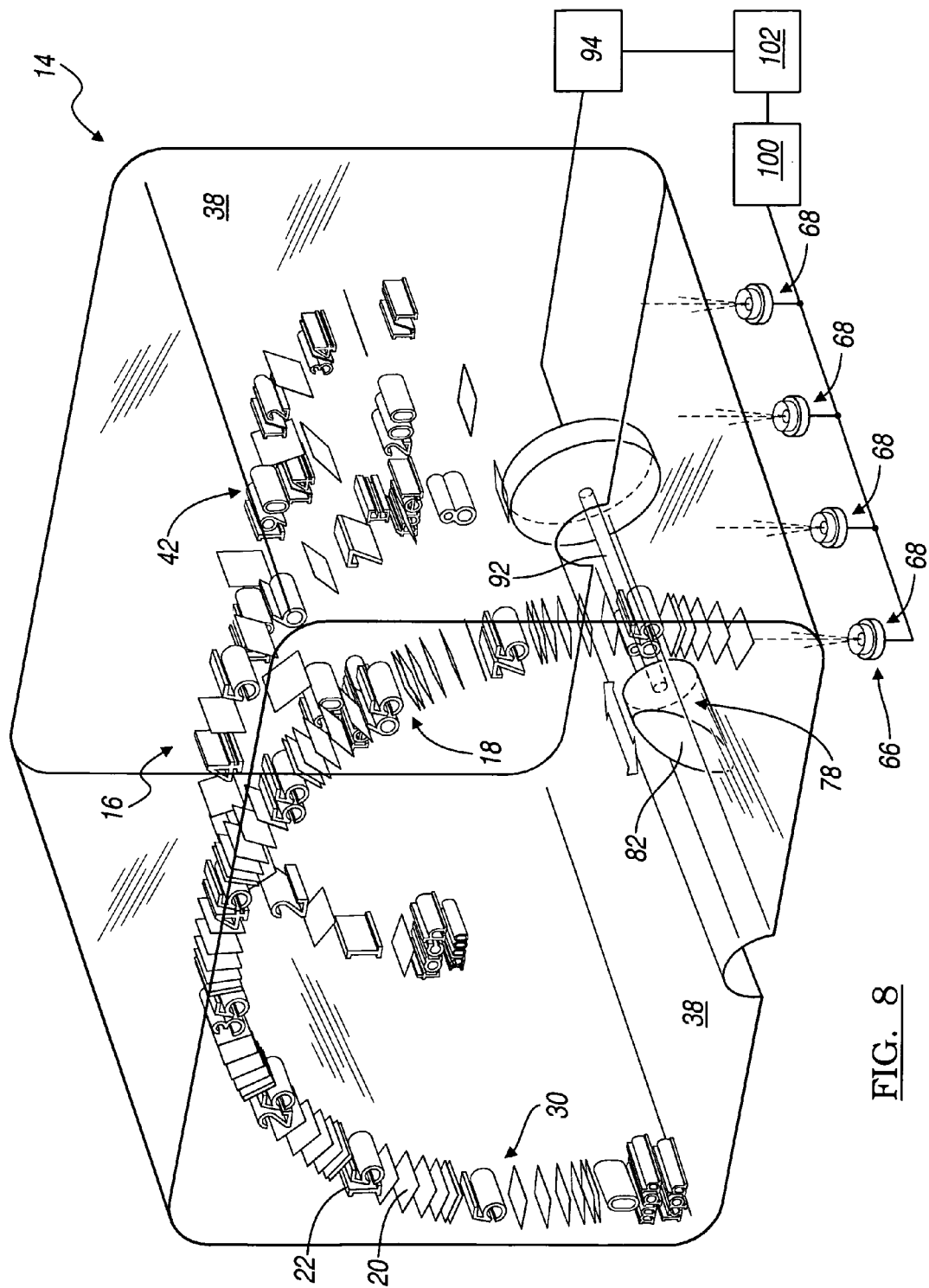
FIG. 8 is a perspective view of an alternative three dimensional instrument cluster showing multiple gauges formed in a display member in accordance with the present teachings.
Figure 9:
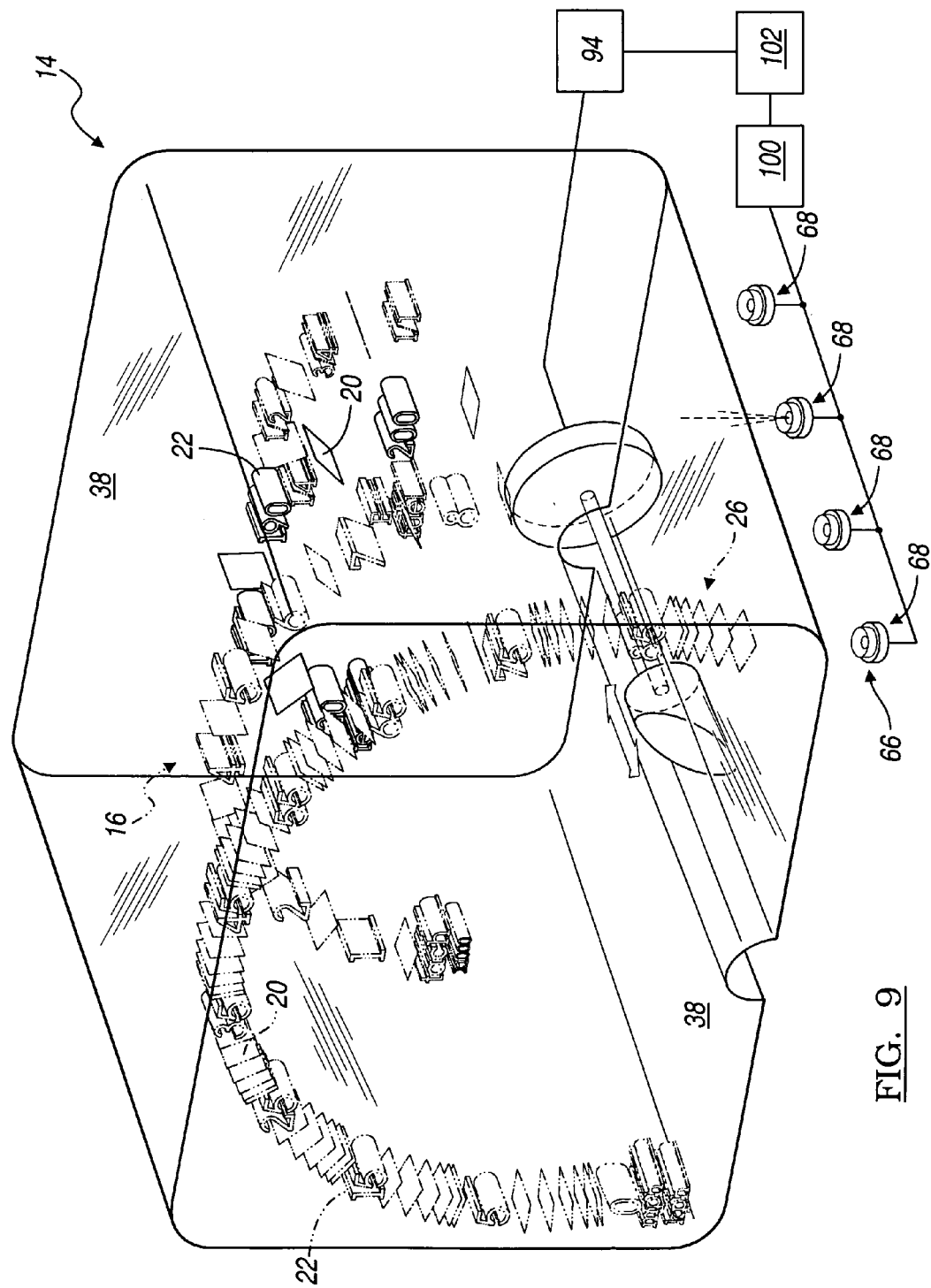
FIG. 9 is similar to FIG. 8 and shows a single gauge illuminated within the display member by the second illumination system.

In other examples and with reference to FIGS. 8 and 9, the holder 96 may be moved relative to the motor 90 and/or the motor module 94 such that the holder 96 may selectively telescope toward or away from the motor 90. As the holder 96 telescopes away from the motor 90, the pointer 34 may be directed to various sets of indicia 18 formed within the display member 38. Each set of indicia 18 may be associated with a different vehicle parameter. In further examples (not specifically illustrated), multiple first illumination systems 36 may be used such that pointers formed by one of multiple first illumination systems may be selectively turned on and off to therefore illuminate certain indicia 18. Moreover, an optical path from the light source 76 to the indicia 18 via the optics 78 may be fixed but the light source 76 may be turned on or off (or maybe selectively obstructed) to control the illumination of the indicia 18.

In an alternative example (not specifically illustrated), the first illumination system 36 may define a plurality of fixed laser lights or light projectors each capable of selectively illuminating the indicia 18. Each light projector may selectively be turned on or off (or selectively obstructed but remain on) such that the one or more projectors that are turned on illuminate the display segment 40 to define the pointer 34.

With reference to FIGS. 3A-4B, the second illumination system 66 may include the light elements 68 or light sources 68 and a light source module 100 that controls the light sources 68 to illuminate all (or a portion) of the indicia 18. The second illumination system 66 is configured to illuminate a greater portion of the display segments 40 relative to the first illumination system 36 but at a lesser intensity. An illumination system module 102 may control the first illumination system 36 and/or the second illumination system 66. It will be appreciated that the modules 81, 94, 98, 100, 102 associated with the three dimension instrument cluster 14 may be one single module or multiple modules. If multiple modules, the modules and/or the engine computer 98 may be directly connected to one another via a suitable connection, for example, a system bus. The multiple modules and/or the engine computer 98 may also communicate wirelessly with various forms of suitable electromagnetic wave communication or combinations thereof.

The term module may refer to an application specific integrated circuit (ASIC), an electronic circuit, a processor (shared, dedicated, or group) and memory that executes one or more software or firmware programs, a combinational logic circuit, or other suitable components that provide the described functionality.

In one example, the light sources 68 of the second illumination system 66 may include a plurality of light emitting diodes (LEDs). The LEDs may generally illuminate the entire display member 38 or portions thereof. The configuration of the indicia 18 relative to the position of the LEDs may be as such that indicia 18 closer to the LEDs (i.e., the light sources 68) have less thickness 64, while indicia farther from the LEDs have a greater thickness 64. In this regard, the indicia 18 closer to the light sources 68 do not cast shadows upon the indicia 18 farther therefrom. In addition to the light sources 68 that generally illuminate the indicia 18 in the display member 38, additional light sources 68 may selectively and directly illuminate certain display indicators 28 (not specifically shown). The light sources 68, may use filters to change color and/or intensity. The light sources 68 or the LEDs may physically abut one or more faces of the display member 38 or may be spaced a short distance therefrom. In other examples, the lights sources 68 may be positioned at a relatively greater distance from the display member 38 so that light guides or tell-tale tunnels (not specifically shown) may be used to direct the light from the light sources 68 to the display indicators 28 formed in the display member 38.

In one example and with reference to FIGS. 8 and 9, the light sources 68 may be selectively activated (or deactivated) to illuminate certain sets of indicia 18 associated with a selected vehicle parameter. By way of the above example, a set of light sources 68 may illuminate a speedometer 30 but then be deactivated (in phantom in FIG. 8) so that a second set of light sources 68 may illuminate a tachometer 104. The first illumination system 36 may adjust the optics 78 so that the pointer 34 may move from the first set of indicia 18 representing the first vehicle parameter to the second set of indicia 18 representing the second vehicle parameter, as the banks of light sources 68 are switched in the second illumination system 66.

Figure 10:
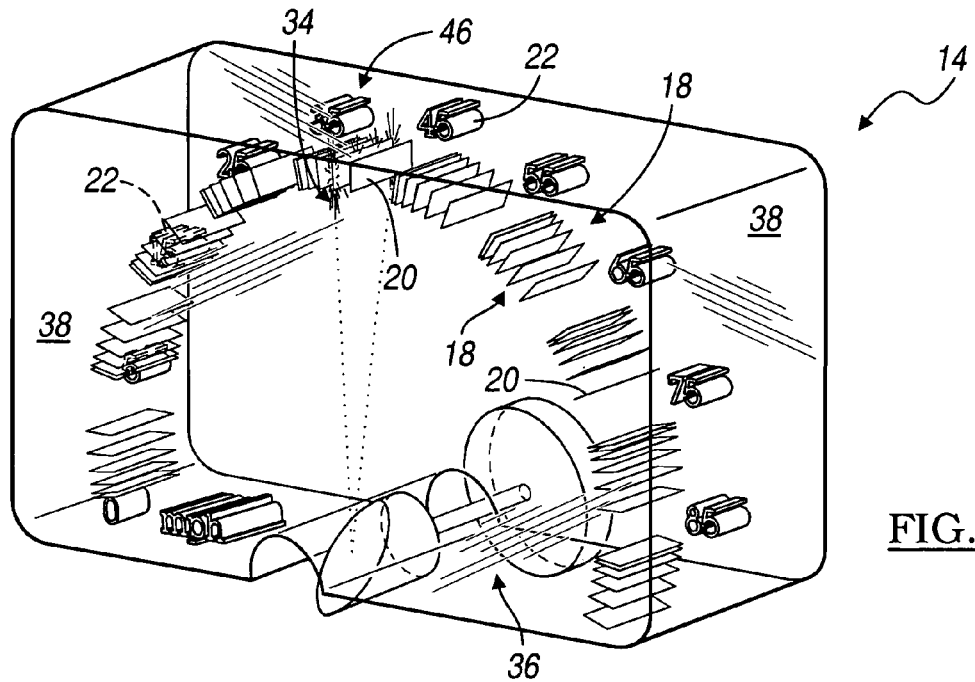
FIGS. 10, 11 and 12 are perspective views of alternative three dimensional instrument clusters in accordance with the present teachings.
Figure 11:
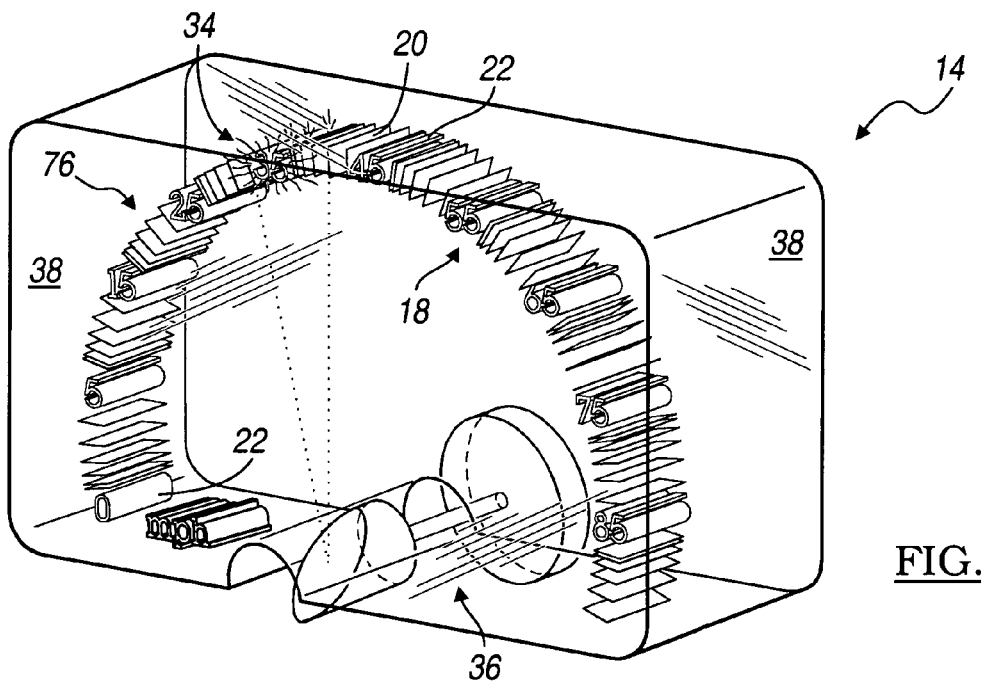
Figure 12:
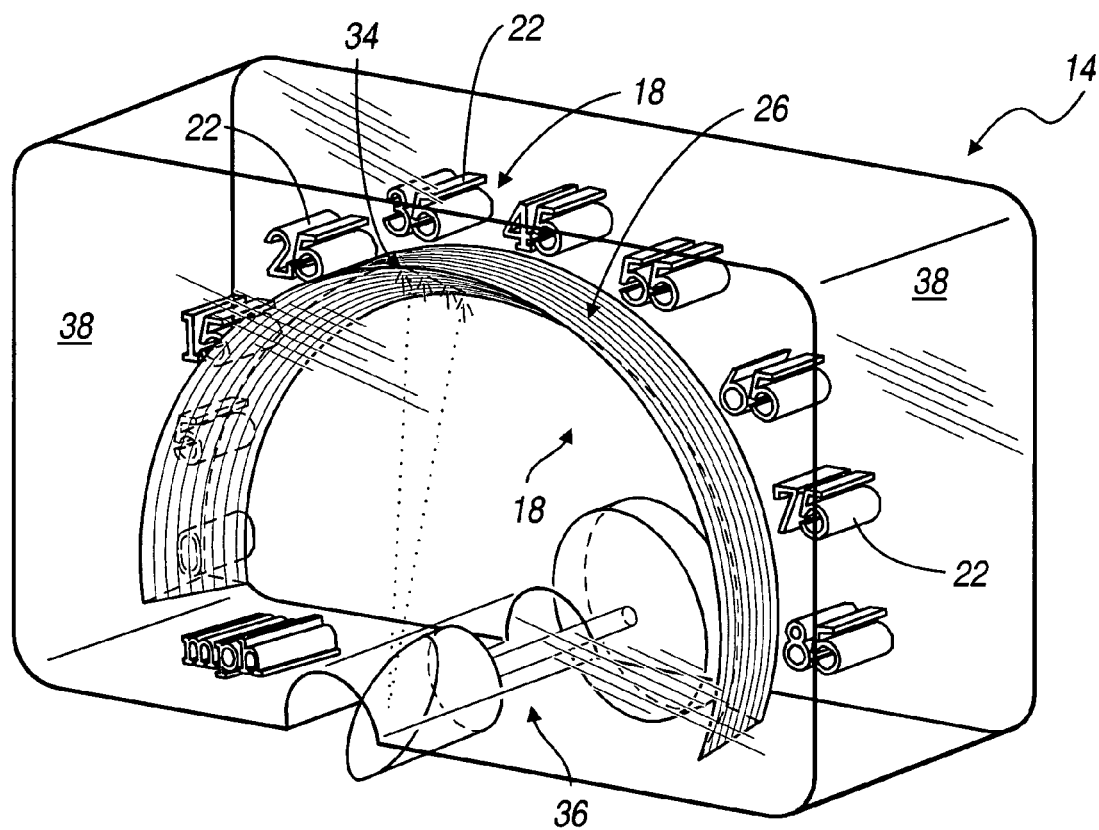

With reference to FIGS. 10, 11 and 12, the display segments 40 that form the indicia 18 may be formed in various arrangements in accordance with present teachings. With reference to FIG. 12, tick marks 20 may be omitted in lieu of an arcuate band 106 spaced from the characters 22 and other indicia 18 that may form the speedometer 30. The first illumination system 36 (FIG. 3A) may illuminate a portion or the arcuate band 106 near one or more of the tick marks 20 and/or the characters 22 to form the pointer 34 and thus indicate a speed of the vehicle, i.e., the value of the vehicle parameter.

With reference to FIGS. 10 and 11, tick marks 20 may be formed in line with (FIG. 11) or spaced from (FIG. 10) the associated characters 22 and other indicia 18 that may form the speedometer 30. The first illumination system 36 (FIG. 3A) may selectively illuminate one or more of the tick marks 20 and/or the characters 22 to form the pointer 34 and thus indicate a speed of the vehicle.

The ability to omit the traditional pointer (e.g., a physical rotatable hub with needle) provides space that may be used for providing other information from the instrument cluster 14. For example, the display 46 may be coupled to the rear face 52 of the display member 38. The display 46 may display, for example, navigation information. It will be appreciated that the light directed from the first illumination system 36 to selectively create the pointer 34 within the display member 38 does not obstruct or interfere with the view of the display 46 or other suitable component that may be coupled to the rear face 52 of the display member 38. Moreover, light from the second illumination system 66 will only reflect on indicia 18 formed within the display member 38 and also not interface or obstruct the display 46 mounted to the rear face 52 of the display member 38. It will be appreciated that the indicia 18 may be formed from either the laser etching process or by the molding process. Notwithstanding the process from which the indicia 18 are made, the indicia 18 and the reflection of light from the indicia 18 will not obstruct the view to the display 46 or other suitable component coupled to the rear face 52 of the display member 38. As such, the illumination of the pointer 34 and/or the illumination of the indicia 18 do not obstruct the view, which would otherwise be obstructed by the traditional rotatable needle and hub combination.

With reference to FIGS. 3A-4B, in operation, the first illumination system 36 receives the signal from the engine computer 98 that may indicate, for example, the vehicle speed. The first illumination system 36 directs laser light into the display member 38 to selectively illuminate one or more indicia 18 or portions thereof. By selectively illuminating the plurality of the display segments 40 that form the indicia 18, the first illumination system 36 creates the pointer 34 at the specific position in the display member 38. The second illumination system 66 provides a general illumination of the entire display member 38 and/or the entire instrument cluster

14. It will be appreciated that as the signal from the engine computer 98 changes, the pointer 34 will move relative to the associated indicia 18 to indicate the change in the value of the vehicle parameter. The instrument cluster 14 may include additional gauges 16 that may include additional associated first illumination systems associated with that gauge 16, as illustrated in FIG. 3A. In other examples, additional first illumination systems may be included to individually illuminate one or more display indicators 28. In other instances, the display indicators 28 may be lit by selective light sources 68 placed adjacent the display member 38.

Figure 13:
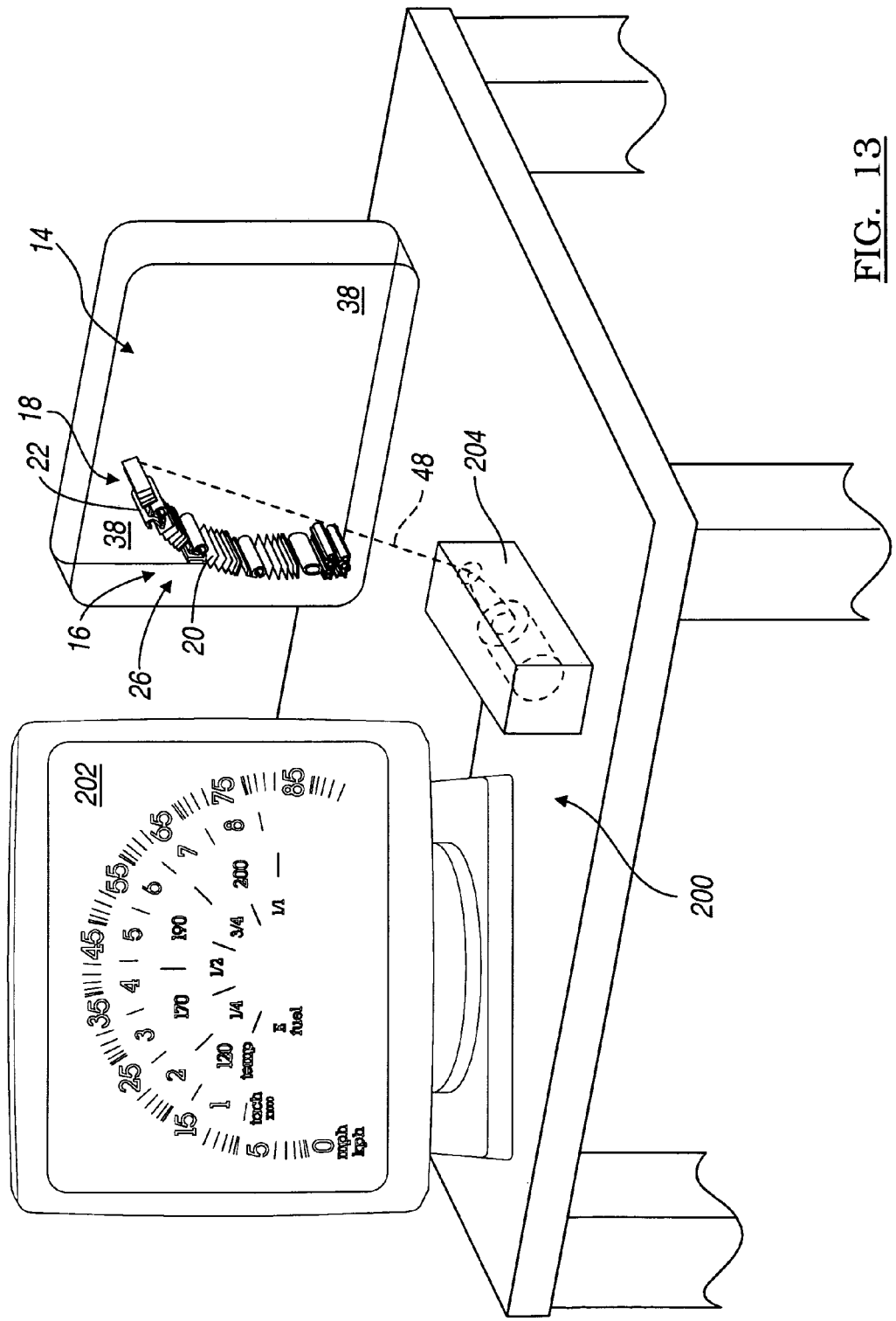
FIG. 13 is a perspective view of a system to construct an exemplary three dimensional instrument cluster in accordance with the present teachings.

With reference to FIG. 13, a display segment fabrication system 200 can be directed to burn (or form) a plurality of the display segments 40 within the display member 38 to form the indicia 18, as required for one or more gauges 16 and/or display indicators 28. A control system 202 may be, for example, a programmable control module into which a design for the instrument cluster 14 may be programmed or loaded. A laser system 204 may produce a laser beam 48 to form the display segments 40 in the display member 38.

For example, when the speedometer 30 is created within the display member 38, the system 200 may activate and control the laser beam 48 to burn in a plurality of the display segments 40. In this regard, the laser beam 48 forms multiple points (e.g., tens of thousands of points) to form a point cloud or the display segments 40. The display segments 40 diffuses light, specifically from the first illumination system 36 more so than the regions that lack the display segments 40. In this regard, the display segments 40 appear to be suspended or floating within the volume of the display member 38. The display segments 40 define the indicia 18 per various designs for the three dimensional instrument clusters 14.

While specific examples have been described in the specification and illustrated in the drawings, it will be understood by those skilled in the art that various changes may be made and equivalents may be substituted for elements thereof without departing from the scope of the present teachings, as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification, as the best mode presently contemplated for carrying out this invention, but that the scope of the present disclosure will include any embodiments falling within the foregoing description and the appended claims.

What is claimed is:

1. A vehicle instrument cluster for indicating a value of a vehicle parameter, the vehicle instrument cluster comprising:
   a display member formed of a transparent material, wherein said display member defines an internal portion within said display member;
   display segments integrally formed in said internal portion within said display member, said display segments including a flat upper surface facing said first external surface, a lower surface disposed opposite the first external surface relative to said flat upper surface, and a flat edge surface extending from said flat upper surface to said lower surface;
   a first illumination system having a light source and an optical member, that is movable in response to a change in the value of the vehicle parameter, wherein said optical member selectively directs the light from said light source into said internal portion within said display member to illuminate at least a portion of said display segments that form indicia to indicate the value of the vehicle parameter.

2. The vehicle instrument cluster of claim 1 wherein said indicia are selected from a group consisting of numbers, letters, tick marks, borders, graphics, indicators, bands and combinations thereof.

3. The vehicle instrument cluster of claim 1 further comprising a second illumination system having at least one light source, whose light illuminates more of said display member than the light from said first illumination system.

4. The vehicle instrument cluster of claim 1 wherein at least a portion of said indicia form a gauge, said gauge selected from a group consisting of a speedometer, a tachometer, a fuel gauge, an oil pressure gauge, a battery voltage gauge, an engine coolant temperature gauge, an outside temperature gauge, and combinations thereof.

5. The vehicle instrument cluster of claim 1 wherein at least a portion of said indicia form a display indicator, said display indicator selected from a group consisting of an open door indicator, an engine maintenance required indicator, a fasten seat belt indicator, a fog lamp indicator, a bright lights indicator, an oil pressure low indicator, an oil pressure high indicator, a voltage low indicator, a voltage high indicator, an anti-lock braking system malfunction indicator, a fuel low indicator, an oil change required indicator, a liftgate open indicator, a right turn signal indicator, a left turn signal indicator, a fuel cap not secured indicator, a cruise control active indicator and combinations thereof.

6. The vehicle instrument cluster of claim 1 further comprising a pointer made of light, wherein said pointer is defined by said display segments illuminated by said first illumination system.

7. The vehicle instrument cluster of claim 1 wherein said indicia have a dimension defining a thickness and wherein the value of said dimension varies based on the position of said indicia within said display member.

8. The vehicle instrument cluster of claim 1 wherein said light source produces a laser beam from within the vehicle instrument cluster that is directed toward said display segments in said interior portion of said display member.

9. The vehicle instrument cluster of claim 8 wherein said optical member includes a mirror having a cylindrically-shaped surface that reflects said laser beam as generally fan-shaped light toward said indicia into said internal portion of said display member, wherein movement of said fan-shaped light is visible and in response to change in the value of the vehicle parameter.

10. The vehicle instrument cluster of claim 1 further comprising a display coupled to said display member and viewable therethrough, said display is selected from a group consisting of a liquid crystal display, a gas plasma display, a cathode ray tube display and combinations thereof.

11. The vehicle instrument cluster of claim 10 wherein said display displays information, said information selected from a group consisting of navigation information, trip information, a gauge indicating the vehicle parameter, satellite radio information, user customizable displays and combinations thereof.

12. A vehicle instrument cluster for indicating a value of a vehicle parameter, the vehicle instrument cluster comprising:

a display member formed of a transparent material, wherein said display member defines an internal portion within said display member and a first external surface, a second external surface and a third external surface, said first external surface operable as a front face of said display member said second external surface opposite said first external surface and said third external surface disposed at a non-zero angle relative to said first surface and said second surface;

display segments integrally formed in said internal portion within said display member, said display segments including a flat upper surface facing said first external surface, a lower surface disposed opposite said first external surface relative to said flat upper surface, and a flat edge surface extending from said flat upper surface to said lower surface, wherein said display segments are configured to diffuse light and to form at least a portion of indicia associated with the vehicle parameter;

a first illumination system having a light source and a motor connected to an optical member, said optical member movable in response to a change in the value of the vehicle parameter, wherein said optical member selectively directs the light from said light source through said third external surface and into said internal portion within said display member to illuminate at least a portion of said display segments that form said indicia to indicate the value of the vehicle parameter, wherein at least a portion of said display segments is disposed in said internal portion and spaced from said external surface.

13. The vehicle instrument cluster of claim 12 wherein said indicia are selected from a group consisting of numbers, letters, tick marks, borders, graphics, indicators, bands and combinations thereof.

14. The vehicle instrument cluster of claim 12 further comprising a second illumination system having at least one light source, whose light illuminates more of said display member than the light from said first illumination system.

15. The vehicle instrument cluster of claim 12 wherein at least a portion of said indicia form a gauge, said gauge selected from a group consisting of a speedometer, a tachometer, a fuel gauge, an oil pressure gauge, a battery voltage gauge, an engine coolant temperature gauge, an outside temperature gauge, and combinations thereof.

16. The vehicle instrument cluster of claim 12 wherein at least a portion of said indicia form a display indicator, said display indicator selected from a group consisting of an open door indicator, an engine maintenance required indicator, a fasten seat belt indicator, a fog lamp indicator, a bright lights indicator, an oil pressure low indicator, an oil pressure high indicator, a voltage low indicator, a voltage high indicator, an anti-lock braking system malfunction indicator, a fuel low indicator, an oil change required indicator, a liftgate open indicator, a right turn signal indicator, a left turn signal indicator, a fuel cap not secured indicator, a cruise control active indicator and combinations thereof.

17. The vehicle instrument cluster of claim 12 further comprising a pointer made of light, wherein said pointer is defined by said display segments illuminated by said first illumination system.

18. The vehicle instrument cluster of claim 12 wherein said indicia have a dimension defining a thickness and wherein the value of said dimension varies based on the position of said indicia within said display member.

19. The vehicle instrument cluster of claim 12 wherein said portion of said display segments are operable to appear to be floating in said internal portion within said display member when said optical member illuminates at least said portion of said display segments.

20. The vehicle instrument cluster of claim 12 wherein said light source produces a laser beam from within the vehicle instrument cluster that is directed through said third external surface toward said display segments in said interior portion of said display member.

21. The vehicle instrument cluster of claim 20 wherein said optical member includes a mirror having a cylindrically-shaped surface that reflects said laser beam as generally a fan-shaped light toward said indicia into said internal portion within said display member, wherein movement of said fan-shaped light is visible and in response to said change in the value of the vehicle parameter.

22. The vehicle instrument cluster of claim 12 further comprising a display coupled to said display member and viewable therethrough, said display is selected from a group consisting of a liquid crystal display, a gas plasma display, a cathode ray tube display and combinations thereof.

23. The vehicle instrument cluster of claim 22 wherein said display displays information, said information selected from a group consisting of navigation information, trip information, a gauge indicating the vehicle parameter, satellite radio information, user customizable displays and combinations thereof.

24. A vehicle instrument display for indicating a value and a change of a vehicle parameter, the vehicle instrument display comprising:

a block of transparent material defining at least a first external surface viewable from the vehicle instrument display, a second external surface generally opposite said first external surface, a third external surface disposed at a non-zero angle relative to said first surface and said second surface and an internal portion disposed between said first and second external surfaces;

indicia forming a gauge that indicates the value of the vehicle parameter, wherein said indicia are integrally formed in said internal portion within said block of material, wherein said indicia are configured to diffuse light, wherein a first portion of said indicia at least includes a flat upper surface facing said first external surface, a lower surface disposed opposite said first external surface relative to said flat upper surface, and a flat edge surface extending from said flat upper surface to said lower surface;

a laser beam selectively directed through said third external surface to illuminate said first portion of said indicia in said interior portion to indicate the value of the vehicle parameter and a second portion of said indicia to indicate the value of the vehicle parameter and the change therein.

25. The vehicle instrument display of claim 24 further comprising a light source, whose light illuminates more of said display member than said laser beam.

26. The vehicle instrument display of claim 24 further comprising a point cloud associated with said gauge and formed in said block of material, said laser beam illuminating a portion of said point cloud to form a pointer that indicates the value of the vehicle parameter associated with said gauge.

27. The vehicle instrument cluster of claim 24 wherein said portion of said indicia are operable to appear to be floating in said internal portion within said block of transparent material when said laser beam illuminates at least said portion of said indicia.

28. The vehicle instrument display of claim 24 wherein said indicia are selected from a group consisting of numbers, letters, tick marks, borders, graphics, indicators and combinations thereof.

29. The vehicle instrument display of claim 28 wherein said indicia define a plurality of gauges, said laser beam operable to indicate the value of the parameter associated with at least one of said gauges therein.

30. A method of forming a three dimensional instrument cluster that indicates a value of a vehicle parameter, the method comprising:

providing a transparent block of material housed in the three dimensional instrument cluster having at least a first external surface viewable from the vehicle instrument display, a second external surface generally opposite said first external surface, a third external surface disposed at a non-zero angle relative to said first surface and said second surface and an internal portion disposed between said first and second external surfaces;

providing a sufficient amount of points in said internal portion of said transparent block of material, wherein said sufficient amount of points at least include a flat upper surface facing said first external surface, a lower surface disposed opposite the first external surface relative to said flat upper surface, and a flat edge surface extending from said flat upper surface to said lower surface;

directing a laser beam through said third external surface into said internal portion within said block of material;

illuminating said sufficient amount of points in said internal portion that diffuse light within said block of material to provide at least a portion of a gauge that is operable to display a value of the vehicle parameter.

31. The method of claim 30 further comprising illuminating said sufficient amount of points of said gauge, wherein said sufficient amount of points in said gauge are operable to appear to be floating within said internal portion of said display member.

32. A method forming an illuminated instruments cluster with perceived 3-D display segments, the method comprising:

providing a transparent block of material having an internal portion;

providing a sufficient amount of points in said internal portion of said transparent block of material, wherein said sufficient amount of points at least include a flat upper surface facing said first external surface, a lower surface disposed opposite the first external surface relative to said flat upper surface, and a flat edge surface extending from said flat upper surface to said lower surface;

directing a laser beam into said internal portion of said block of material;

illuminating said points in said internal portion that diffuse light within said transparent block of material to provide at least a portion of a gauge;

indicating a value of a vehicle parameter on said portion of said gauge with said laser beam when said laser beam is illuminating said points in said internal portion.

33. The method of claim 32 when said laser beam is illuminating said portion of said gauge wherein said points in said gauge are operable to appear to be floating within said internal portion of said display member.

34. The method of claim 32 further comprising viewing a display through said transparent block of material, wherein said display displays information selected from a group consisting of navigation information, trip information, satellite radio information, user customizable displays and combinations thereof.

\* \* \* \* \*